UNITED STATES PATENT OFFICE 2,344,267

PROTEINOUS COMPOSITIONS AND THEIR PROCESS OF PRODUCTION

Henry C. Reitz, Berkeley, Calif., assignor to Claude R. Wickard, as Secretary of Agriculture of the United States of America, and his successors in office No Drawing. Application March 10, 1943, Serial No. 478,665

15 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to proteinous compositions, more particularly to sulfur-containing protein reaction products, and has for its objects the provision of new and useful protein derivatives, and a process for their production.

I have found that new proteinous compounds containing sulfur in excess of 2 percent by weight can be obtained by reacting proteins, such as casein or the prolamines contained in wheat gluten, for example, with a sulfur trioxide-yielding agent such, for example, as chlorosulfonic acid, in the presence of a tertiary amine.

The sulfated proteins so obtained form stable salts with basic substances, and I have found that certain of these salts, especially the ammonium salts, and the alkali-metal salts of such sulfated proteins, which contain substantially 4 to 7 percent sulfur, possess the property of readily absorbing large quantities of water, and yield colorless, odorless and tasteless gels. The volume of such an aqueous gel is frequently several hundred times that of the dry salt. Because of these properties the ammonium salts and alkali-metal salts of the sulfated proteins are valuable as substitutes for natural gums, such, for instance, as gum tragacanth, and are eminently suited for use as emulsifying agents and for other similar purposes. Due to their absorptive powers, some of them, especially the ammonium salt, sodium salt and potassium salt of the sulfated gluten, are also useful as surgical dressings.

In general, the products of this invention are satisfactorily obtained by reacting a protein, such as wheat gluten or casein, with chlorosulfonic acid in the presence of a tertiary amine, such as pyridine or triethylamine, at a temperature of about 60° to 90° C. The time of reaction varies depending on the nature of the reactants and the operating conditions. Satisfactory results may be obtained by heating the mixture for ½ to 5 hours, the reaction proceeding more rapidly at the higher temperatures.

The tertiary amine salt of sulfated protein thus obtained is isolated from the reaction mixture by treatment with a water-soluble solvent, such as ethyl alcohol, acetone, diacetone alcohol, butyl alcohol, methyl or butyl ether of ethylene glycol, for example.

Such salt may be converted to the ammonium salt, alkali metal salt, or alkaline earth metal salt by treatment with the corresponding hydroxide.

The resulting products contain about 4 to 7 percent sulfur. They may be further purified by any suitable means and be converted to an anhydrous state by drying.

As an illustrative embodiment of a manner in which this invention may be carried out in practice, the following examples are given wherein parts are by weight.

Example I

Four parts of chlorosulfonic acid was added, gradually and with vigorous agitation, to 12 parts anhydrous pyridine, the mixing vessel being cooled by immersion in an ice bath. The resulting pasty mixture was charged in a "Waring Blendor" bowl and one part of dry wheat gluten, containing 14.1 percent nitrogen and 0.92 percent sulfur, was added gradually with efficient agitation. The mixture thus obtained was heated in a water bath at 80° C. for one-half hour.

The resulting dark-colored syrupy liquid was mixed with 95 percent ethyl alcohol in a "Waring Blendor" run at low speed. The pyridine salt of sulfated gluten was precipitated and on subsequent washing with alcohol was obtained as a friable solid material from which most of the alcohol could be separated by decantation.

The pyridine salt was suspended in water and the suspension was made alkaline to phenolphthalein by addition of 1.0 normal aqueous sodium hydroxide. The sodium salt of sulfated gluten thus formed was separated from the liquid phase of the mixture by centrifugation, was washed with water and with 95 percent alcohol, and was dried.

The dry product contains 6.8 percent sulfur and 10.1 percent nitrogen. It absorbs water very rapidly, forming a colorless, tasteless, odorless gel which has about 300 times the volume of the dry material.

The sodium salt may also be purified by precipitation of the aqueous gel with acetone followed by drying in a vacuum oven at 60° C. The product so obtained also possessed good gelling properties.

Example II

Fifty-nine parts of technical chlorosulfonic acid was added dropwise, with efficient stirring and cooling, to 180 parts of pyridine. Fifteen parts of wheat gluten was added with vigorous stirring to the pyridine-chlorosulfonic acid reaction product. The mixture was then heated at 70° C. for 2 hours.

The resulting reaction product was poured with stirring into 250 cc. of monobutyl ether of ethylene glycol, was filtered and the precipitate was thoroughly washed with ethylene glycol monobutyl ether. The washed material was suspended in 100 cc. of methyl alcohol containing 5 percent sodium acetate, and was filtered, this procedure being repeated five times. The residue was then washed with 750 cc. of 65 percent ethyl alcohol, and the washed material was centrifuged.

The centrifuged material was suspended in water and the pH of the suspension was adjusted to a value of 7.0 by addition of 0.5 normal aqueous sodium hydroxide, was centrifuged, was washed with water, and was dried on glass plates at room temperature.

The properties of the sodium salt of sulfated gluten thus obtained are similar to those of the product obtained according to Example I.

*Example III*

By substituting aqueous potassium hydroxide or ammonium hydroxide for sodium hydroxide in the procedure of Example I, the potassium salt or the ammonium salt of sulfated gluten is formed. The properties of these salts are similar to those of the sodium salt of Example I.

*Example IV*

One part of dry wheat gluten was added to 12 parts of anhydrous pyridine. To this mixture 4 parts of chlorosulfonic acid was added dropwise, with efficient stirring and cooling. The mixture was then heated on a water bath at 80° C. for one-half hour.

The resulting dark-colored, syrupy liquid was poured into 95 percent ethyl alcohol and the pyridine salt that separated was dried over night in a vacuum desiccator.

The dried pyridine salt was suspended in water and the suspension was made alkaline to phenolphthalein with sodium hydroxide. The sodium salt of sulfated gluten was separated by centrifugation and washed with water and with 95 percent alcohol and dried.

A product similar to that of Example I was obtained.

Having thus described my invention, I claim:

1. The process of producing sulfated proteins containing in excess of 2 percent sulfur, comprising reacting a prolamine with chlorosulfonic acid in the presence of a tertiary amine at a temperature of from about 60° to 90° C.

2. The process of producing sulfated wheat gluten, comprising reacting the gluten with chlorosulfonic acid in the presence of a tertiary amine.

3. The process as defined in claim 2, wherein the tertiary amine is pyridine.

4. The process of producing sulfated wheat gluten containing in excess of 2 percent sulfur, comprising reacting wheat gluten at a temperature of from about 60° to 90° C. with the product formed by the interaction of chlorosulfonic acid with a tertiary amine.

5. The process as defined in claim 4, wherein the tertiary amine is pyridine.

6. A tertiary amine salt of sulfated wheat gluten containing from 4 to 7 percent sulfur.

7. The pyridine salt of sulfated wheat gluten containing from 4 to 7 percent sulfur.

8. The process of producing a salt of sulfated gluten containing from 4 to 7 percent sulfur, comprising reacting the gluten with chlorosulfonic acid in the presence of a tertiary amine, and reacting the resulting tertiary amine salt of sulfated protein with a hydroxide.

9. A process for producing a salt of sulfated wheat gluten, containing from 4 to 7 percent of sulfur and which will absorb a large quantity of water, comprising reacting the wheat gluten with chlorosulfonic acid in the presence of a tertiary amine at a temperature of from about 60° to 90° C. for an interval of about one-half hour or more, isolating the resulting tertiary amine salt of sulfated protein, reacting the isolated salt with an alkali metal hydroxide, separating the salt thus formed from the reaction mixture, and drying the separated salt.

10. A process for producing a salt of sulfated wheat gluten, containing from 4 to 7 percent of sulfur and which will absorb a large quantity of water, comprising reacting the wheat gluten with chlorosulfonic acid in the presence of a tertiary amine at a temperature of about 60° to 90° C. for an interval of about one-half hour or more, isolating the resulting tertiary amine salt of sulfated protein, reacting the isolated salt with sodium hydroxide, separating the salt thus formed from the reaction mixture, and drying the separated salt.

11. A process for producing a salt of sulfated wheat gluten, containing from 4 to 7 percent of sulfur and which will absorb a large quantity of water, comprising reacting the wheat gluten with chlorosulfonic acid in the presence of a tertiary amine at a temperature of from about 60° to 90° C. for an interval of about one-half hour or more, isolating the resulting tertiary amine salt of sulfated protein, reacting the isolated salt with an alkaline earth hydroxide, separating the salt thus formed from the reaction mixture, and drying the separated salt.

12. A process for producing a salt of sulfated wheat gluten, containing from 4 to 7 percent of sulfur and which will absorb a large quantity of water, comprising reacting the wheat gluten with chlorosulfonic acid in the presence of a tertiary amine at a temperature of from about 60° to 90° C. for an interval of about one-half hour or more, isolating the resulting tertiary amine salt of sulfated protein, reacting the isolated salt with ammonium hydroxide, separating the salt thus formed from the reaction mixture, and drying the separated salt.

13. An alkali metal salt of sulfated wheat gluten containing from 4 to 7 percent sulfur.

14. The ammonium salt of sulfated wheat gluten containing from 4 to 7 percent sulfur.

15. The sodium salt of sulfated wheat gluten containing from 4 to 7 percent sulfur.

HENRY C. REITZ.